US011928937B2

(12) United States Patent
Palmisano

(10) Patent No.: US 11,928,937 B2
(45) Date of Patent: Mar. 12, 2024

(54) GAMING SYSTEM AND METHOD FOR MODIFYING A WAGER GAME

(71) Applicant: Aristocrat Technologies Australia PTY Limited, North Ryde (AU)

(72) Inventor: Angelo Palmisano, Henderson, NV (US)

(73) Assignee: Aristocrat Technologies Australia Pty Limited, North Ryde (AU)

(*) Notice: Subject to any disclaimer, the term of this patent is extended or adjusted under 35 U.S.C. 154(b) by 270 days.

(21) Appl. No.: 16/915,370

(22) Filed: Jun. 29, 2020

(65) Prior Publication Data

US 2020/0327781 A1 Oct. 15, 2020

Related U.S. Application Data

(63) Continuation of application No. 14/927,579, filed on Oct. 30, 2015, now Pat. No. 10,699,530.

(60) Provisional application No. 62/073,199, filed on Oct. 31, 2014.

(51) Int. Cl.
*G07F 17/00* (2006.01)
*G07F 17/32* (2006.01)

(52) U.S. Cl.
CPC ...... *G07F 17/3288* (2013.01); *G07F 17/3211* (2013.01); *G07F 17/3227* (2013.01); *G07F 17/326* (2013.01)

(58) Field of Classification Search
CPC ............. G07F 17/3288; G07F 17/3211; G07F 17/3227; G07F 17/326
See application file for complete search history.

(56) References Cited

U.S. PATENT DOCUMENTS

| | | | |
|---|---|---|---|
| 6,350,199 B1 | 2/2002 | Williams |
| 7,169,052 B2 | 1/2007 | Beaulieu |
| 7,874,919 B2 | 1/2011 | Paulsen |
| 8,187,073 B2 | 5/2012 | Beaulieu |
| 8,221,205 B2 | 7/2012 | Yoshizawa |
| 8,360,862 B2 | 1/2013 | Allen |
| 8,974,289 B2 | 3/2015 | Allen |
| 9,183,700 B2 | 11/2015 | Allen |
| 9,208,645 B2 | 12/2015 | Allen |

(Continued)

OTHER PUBLICATIONS

AU Examination Report for AU Application No. 2015249070, dated Nov. 5, 2016. 6 Pages.

(Continued)

*Primary Examiner* — James S. McClellan
*Assistant Examiner* — Jeffrey K Wong
(74) *Attorney, Agent, or Firm* — Armstrong Teasdale LLP

(57) ABSTRACT

A gaming system including a gaming machine, a host computer, and a computing device of a user connected through a network is provided. The gaming machine may include a storage device that may store user media data corresponding to a player of the gaming machine, the user media data being received from a host computer. The gaming machine may also include a controller that may modify at least one parameter of a wager game being wagered on by the player based on the user media data by inserting at least one of an image, a video, and an audio of the user media data into the at least one parameter. The gaming machine may further include a display that may output the wager game having the at least one parameter modified with the user media data.

20 Claims, 8 Drawing Sheets

(56) References Cited

U.S. PATENT DOCUMENTS

| | | | | |
|---|---|---|---|---|
| 2003/0148812 | A1 | 8/2003 | Paulsen | |
| 2005/0261058 | A1* | 11/2005 | Nguyen | G07F 17/3255 463/40 |
| 2006/0281511 | A1 | 12/2006 | Holm | |
| 2007/0207855 | A1 | 9/2007 | Moody | |
| 2007/0222452 | A1 | 9/2007 | Miyake | |
| 2008/0128988 | A1 | 6/2008 | Mullen | |
| 2008/0280669 | A1 | 11/2008 | Kane | |
| 2009/0094287 | A1 | 4/2009 | Johnson | |
| 2010/0120533 | A1 | 5/2010 | Bracken | |
| 2010/0317435 | A1* | 12/2010 | Velu | G07F 17/32 463/31 |
| 2011/0159952 | A1* | 6/2011 | Kerr | G07F 17/3241 463/29 |
| 2011/0212782 | A1 | 9/2011 | Thompson | |
| 2012/0015735 | A1* | 1/2012 | Abouchar | G07F 17/3237 463/42 |
| 2012/0282995 | A1 | 11/2012 | Allen | |
| 2013/0203490 | A1* | 8/2013 | Hilbert | G07F 17/3218 463/30 |
| 2013/0217483 | A1 | 8/2013 | Schoenberg | |
| 2013/0225279 | A1 | 8/2013 | Patceg | |
| 2014/0274392 | A1 | 9/2014 | Beran | |
| 2015/0011309 | A1 | 1/2015 | Eloff | |
| 2015/0087369 | A1* | 3/2015 | McIntyre | G07F 17/3218 463/31 |
| 2015/0165313 | A1 | 6/2015 | Thompson | |
| 2015/0379808 | A1* | 12/2015 | Rosenblatt | G07F 17/3227 463/20 |

OTHER PUBLICATIONS

AU Examination Report for AU Application No. 2015249070, dated Sep. 12, 2017. 5 Pages.

AU Examination Report for AU Application No. 2017251737, dated Apr. 19, 2018. 5 Pages.

AU Patent Examination Report No. 1 for related application 2015249070 dated Nov. 5, 2016; 6 pp.

Australian Office Action issued in AU2019202457, dated Apr. 15, 2020, 5 pages.

Australian Examination Report No. 1 issued in App. No. AU2021202283, dated Apr. 23, 2022, 5 pages.

* cited by examiner

GAMING SYSTEM AND METHOD FOR MODIFYING A WAGER GAME

CROSS-REFERENCE TO RELATED APPLICATIONS

The present application is a continuation of U.S. patent application Ser. No. 14/927,579, filed Oct. 30, 2015, and titled "GAMING SYSTEM AND METHOD FOR MODIFYING A WAGER GAME", which claims the benefit of priority to U.S. Provisional Patent Application No. 62/073,199, filed Oct. 31, 2014, and titled "GAMING SYSTEM, CONTROLLER AND METHOD", all of which are incorporated herein by reference in their entireties.

BACKGROUND

The embodiments described herein relate generally to gaming systems and methods for increasing user interest, and more particularly, to gaming systems and methods which incorporate personal digital media of a user into an output of a wager game played on a gaming machine.

Gaming machines have been a popular form of entertainment for many years. Gaming machines include mechanical gaming machines and electronic gaming machines. Mechanical gaming machines include a console typically with buttons, a display for displaying a game, and a mechanical lever that may be pulled by a player in order to play the game.

Recently, the popularity of gaming machines has been enhanced with the advancement of electronic and/or computer-based gaming machines. For example, electronic gaming machines may be connected to other electronic gaming machines, one or more servers, one or more host devices, and the like, through a network, such as through the Internet. Electronic gaming machines typically do not include very many moving parts, but rather generate a graphical representation of a game based on media data displayed on a screen of the electronic gaming machine. Because a player is essentially playing a computer game or a video game, manufacturers are able to offer more interactive elements, such as advanced bonus games and advanced video graphics, to players.

Many different types of wagering games are capable of being played on electronic gaming machines. Wagering games include, for example, standard slot-machine type games (i.e., spinning reels), poker machines, keno, bingo, blackjack, roulette, pachinko, and the like. A user will typically place a bet to begin a game, and win or lose a game based on the rules of the game.

However, an electronic gaming machine typically provides the same digital media to each user playing a game on the gaming machine. For example, the digital media typically includes images of reels, images of symbols such as on a spinning wheel, character images, background images, and the like, which are identically provided each time a game is played. While such games provide users with enjoyment from gaming, a need exists for gaming machines that may be used to enhance player enjoyment through other ways.

BRIEF DESCRIPTION

In one aspect, a gaming machine is provided. The gaming machine includes a storage device that stores user media data corresponding to a player of the gaming machine. The user media data may be received from a host computer. The gaming machine includes a controller that modifies at least one parameter of a wager game being wagered on by the player based on the user media data by inserting at least one of an image, a video, and an audio of the user media data into the at least one parameter of the wager game. The gaming machine also includes a display that outputs the wager game having the at least one parameter modified with the user media data.

In another aspect, a controller of a gaming machine is provided. The controller includes a storage device that stores user media data corresponding to a player of the gaming machine. The user media data may be received from a host computer. The controller also includes a central processing unit (CPU) that modifies at least one parameter of a wager game being wagered on by the player based on the user media data by inserting at least one of an image, a video, and an audio of the user media data into the at least one parameter of the wager game. The controller further controls a display of the gaming machine to output the wager game having the at least one parameter modified with user media data.

In yet another aspect, a host computer is provided. The host computer includes a receiver that receives user identification information of a user and user media data from the user. The host computer includes a processor that registers the user with the host computer, and generates a player profile for the user. The player profile may be electronically linked with the user identification information and the user media data. The host computer also includes a transmitter that transmits the user media data. Here, the transmitter may transmit the user media data to the gaming machine, in response to the receiver receiving user identification information corresponding to the registered user from the gaming machine, and transmit the user media data to the gaming machine, in response to the receiver receiving a gaming machine identification of the gaming machine from the registered user.

In yet another aspect, a method conducted by a gaming machine is provided. The method includes storing user media data corresponding to a player of the gaming machine. The user media data may be received from a host computer. The method also includes modifying at least one parameter of a wager game being wagered on by the player based on the user media data by inserting at least one of an image, a video, and an audio of the user media data into the at least one parameter. The method also includes outputting the wager game having the at least one parameter modified with the user media data.

BRIEF DESCRIPTION OF THE DRAWINGS

The embodiments described herein may be better understood by referring to the following description in conjunction with the accompanying drawings.

DETAILED DESCRIPTION

Figure 1:
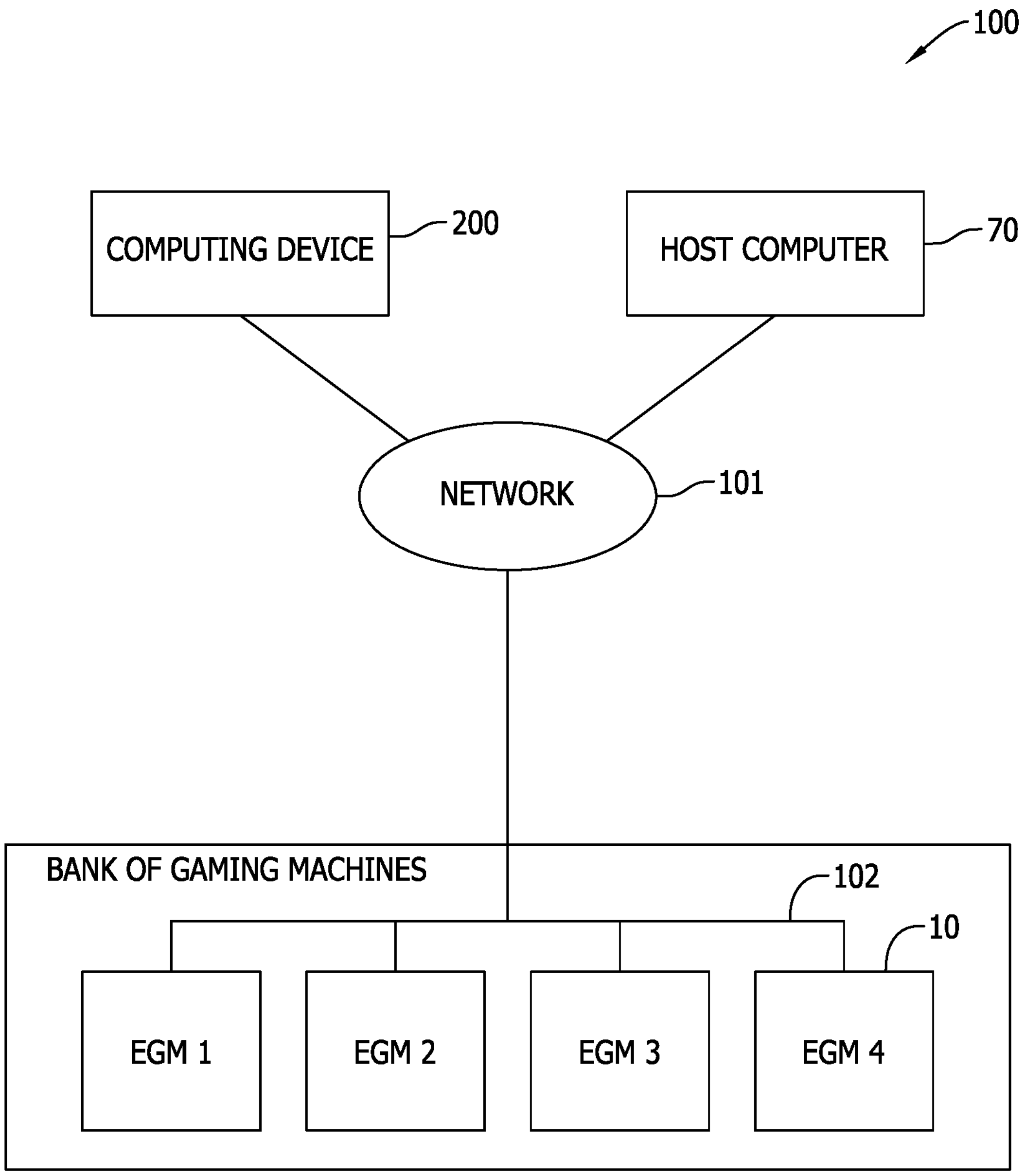
FIG. 1 is a diagram illustrating an exemplary gaming system.

The embodiments described herein relate generally to gaming systems and methods that provide games of chance to a player operating a gaming machine and, more particularly, to gaming systems and methods for personalizing aspects of wager games played on a gaming machine such as a networked electronic gaming machine.

Exemplary technical effects of the systems and methods described herein include at least one of: (a) storing user media data corresponding to a player of the gaming machine; (b) modifying at least one parameter of a wager game being wagered on by the player based on the user media data by inserting at least one of an image, a video, and an audio of the user media data into the at least one parameter; and (c) outputting the wager game having the at least one parameter modified with the user media data.

In some examples, an electronic gaming machine may also be referred to herein as a computer-based gaming machine, and the like. A typical electronic gaming machine provides the same media data to each player of a game on the gaming machine. For example, each time a player initiates a gaming session, the gaming machine may output the same digital icons, images, characters, background, audio, and the like for reel symbols, backgrounds, feature characters, and any other image or audio related parameter of the respective game.

Described herein is a gaming machine that enables a player (also referred to as a user) to personalize or to otherwise modify the display and/or audio of a game played on the gaming machine. For example, the user may modify or adjust images, video, and/or audio of a wager game played on the gaming machine based on media data uploaded by or otherwise received from a user. The gaming machine may receive the media data directly from the user, or may receive the user media data from a host computer included in a system that includes the gaming machine and a user computing device that are network connected to the host computer.

In the exemplary system, the user may upload contents, media data, and the like, from a computing device of the user to the host computer, for example, through a software application, such as a website or mobile application stored at, maintained, and provided by the host computer and accessed by the user through the computing device. In such an embodiment, data uploaded by the user may be electronically linked to a player profile of the user through the use of security information, such as for example, a password, username, biometric information, and the like. Accordingly, when the user initiates a gaming session on a gaming machine, the gaming machine may receive user media data from the host computer that was previously uploaded to the host computer, for example, in response to the user swiping a loyalty card, the user inputting security information, the user transmitting a bar code of the gaming machine to the host computer, and/or the like.

In response to receiving the user media data, the gaming machine may modify, alter, replace, or otherwise adjust features of a wager game that are output by the gaming machine to include user media data, thereby personalizing the wager game with respect to the user. In this example, personalized user media data may be inserted into a wager game being wagered on by a user. Accordingly, the gaming machine may modify an output of a wager game based on the user media data by inserting at least one of an image, a video, and an audio of the user media data into a parameter of the wager game.

For example, user media data may be used to replace default images of various game parameters such as playing card designs, reel symbols, backgrounds, feature characters, and any other image or audio related parameter of the wager game. By populating one or more features of the game with user media data, the game becomes more personalized for the user, thus increasing user enjoyment of the game while the user plays and places wagers on the game.

FIG. 1 is a diagram illustrating an exemplary gaming system 100. In the exemplary embodiment, gaming system 100 includes a host computer 70, a computing device 200, and a plurality of gaming machines 10, such as electronic gaming machines (EGM). In this example, computing device 200 and gaming machines 10 are connected to host computer 70 via a network 101. Accordingly, computing device 200 and gaming machines 10 may transmit and receive data to and from host computer 70 via a network connection. For example, network 101 may be the Internet, and may include a wired connection, a wireless connection, or a combination thereof.

Host computer 70 may include one or more computing devices (not shown), such as but not limited to, a personal computer, a server, a cloud-based server, a mobile computer, and/or the like. Computer 70 may be used to host a software application, for example, a website (i.e. host site), a mobile application, and the like, which may be used to retrieve data from a user of computing device 200 and/or gaming machine 10. Computing device 200 may also include one or more computing devices, for example, a personal computer, a laptop computer, a desktop computer, a mobile device, a tablet, an MP3 player, a personal digital assistant (PDA), and the like. For example, the user may use a personal computer to access a website hosted by host computer 70, or the user may use a mobile device to access a mobile application hosted by host computer 70.

Gaming machine 10 may be an electronic gaming machine located in a casino, airport, or other location. Machine 10 may be used to play one or more of a variety of types of games such as a slot machine, a poker game, keno, bingo, blackjack, roulette, pachinko, lottery, a jackpot, and/or the like. In some examples, gaming machine 10 may include a progressive jackpot that may gradually increase based on games played at gaming machine 10, and/or games played at neighboring or networked gaming machines 10 that are also included in the progressive jackpot. In FIG. 1, four gaming machines 10 are illustrated and the four machines 10 are connected to each other via a local network 102, for example, a local area network (LAN), and the like. However, it should be appreciated that gaming system 100 may also include more or less than four gaming machines, and is not limited to only four gaming machines.

Computing device 200 may include an input unit (not shown), for example, a keyboard, mouse, touchpad, vocal recognition module, display recognition module, and/or the like, that are capable of receiving input from a user. Device 200 may also include a display (not shown) that displays a website or mobile application hosted by host computer 70 that enables a user of computing device 200 to register. Computing device 200 also includes a memory (not shown) that is capable of storing data, such as, personalized user media data that may be received from a user. For example, the user media data may be uploaded by the user through a detachable memory such as a flash driver, external hard drive, and the like, which are capable of being electronically connected and disconnected from computing device 200. In another example, the user media data may be downloaded from a website, cloud memory, an email account, and the like.

Host computer 70 may include a storage device or a plurality of storage devices. In some example, host computer 70 may be a cloud-based server or may be connected to a remote storage device such as cloud storage. Also, host computer 70 may host a software application such as a website, mobile application, and/or the like, which may be used to register users, receive personal digital media from registered users, and enable a registered user to select user media data that is to be used for parameters of a game offered by gaming machine 10. Accordingly, users registered with the software application hosted by host computer 70 may upload personalized user digital media, for example, from computing device 200, through network 101, to host computer 70. The uploaded user digital media may be electronically linked to a player profile of the user that is stored and maintained by the software application of host computer 70.

The software application may also enable a user to select user media that is to be electronically linked to one or more parameters of wager a game offered by gaming machine 10. For example, using the input unit of computing device 200, a user may select content from the user media data that is to be linked to parameters of a wager game playable on gaming machine 10. The user media data that is linked to the parameters may be stored the host computer 70 as part of a player profile of the user, and maintained by the software application of host computer 70. For example, a user may personalize or customize symbols, images, characters, backgrounds, music, and other parameters of a wager game such that they are represented by user media data instead of default data of the game. Accordingly, user preferences of media that are to be displayed or output in place of default parameters of a game provided by gaming machine 10 may be stored in or electronically linked to the player profile corresponding to the user.

In the exemplary embodiment, the software application implemented by host computer 70 is accessible via network 101, such as a public network. The software application may include a web browser that may be accessed via a web portal or mobile application for enabling players to register with the software application, and to enable registered players to upload digital media via network 101 using computing device 200. For example, when a user registers with the software application via the web portal or mobile application, security information may be electronically linked with a player profile of a registered user. In this example, the security information may include one or more of a username, password, biometric information, RFID tag, loyalty card account number, and the like. Accordingly, when a user accesses a gaming machine 10, the user may input the security information and gaming machine 10 may transmit the security information to host computer 70 for verification. In response to verifying the user, for example, using the software application, host computer 70 may transmit user media data and preferences of the user which are previously established and stored in a player profile corresponding to the user and corresponding to the security information. Accordingly, gaming machine 10 may output a wager game in which one or more default parameters of the game are replaced or modified with user media data that has been uploaded to the host computer.

In the exemplary embodiment, at least one gaming machine 10 is included on which registered players can play wager games. More specifically, in the exemplary embodiment, gaming machines 10 are connected to a local area network (LAN) 102 and may be located in a bank of gaming machines located on a casino floor (not shown). It should be understood that this is merely an example, and gaming machines 10 are not limited to only being located at a casino. For example, networked gaming machines 10 may be located in different venues and accessible via different networks, depending on the desired implementation.

Each gaming machine 10 electronically communicates with host computer 70 to obtain user media data stored at host computer 70 and which is electronically linked with a player profile of a user of gaming machine 10 for personalizing the wager games played thereon. For example, a secured socket layer (SSL) protocol may be used by gaming machines 10 to access the software application of host computer 70 outside LAN 102. Accordingly, gaming machines 10 may communicate with host computer 70 through an encrypted link via network 101. It should also be appreciated that gaming machines 10 may communicate with host computer 70 or any suitable network including, for example, a private wide area network (WAN), and the like.

Figure 2:
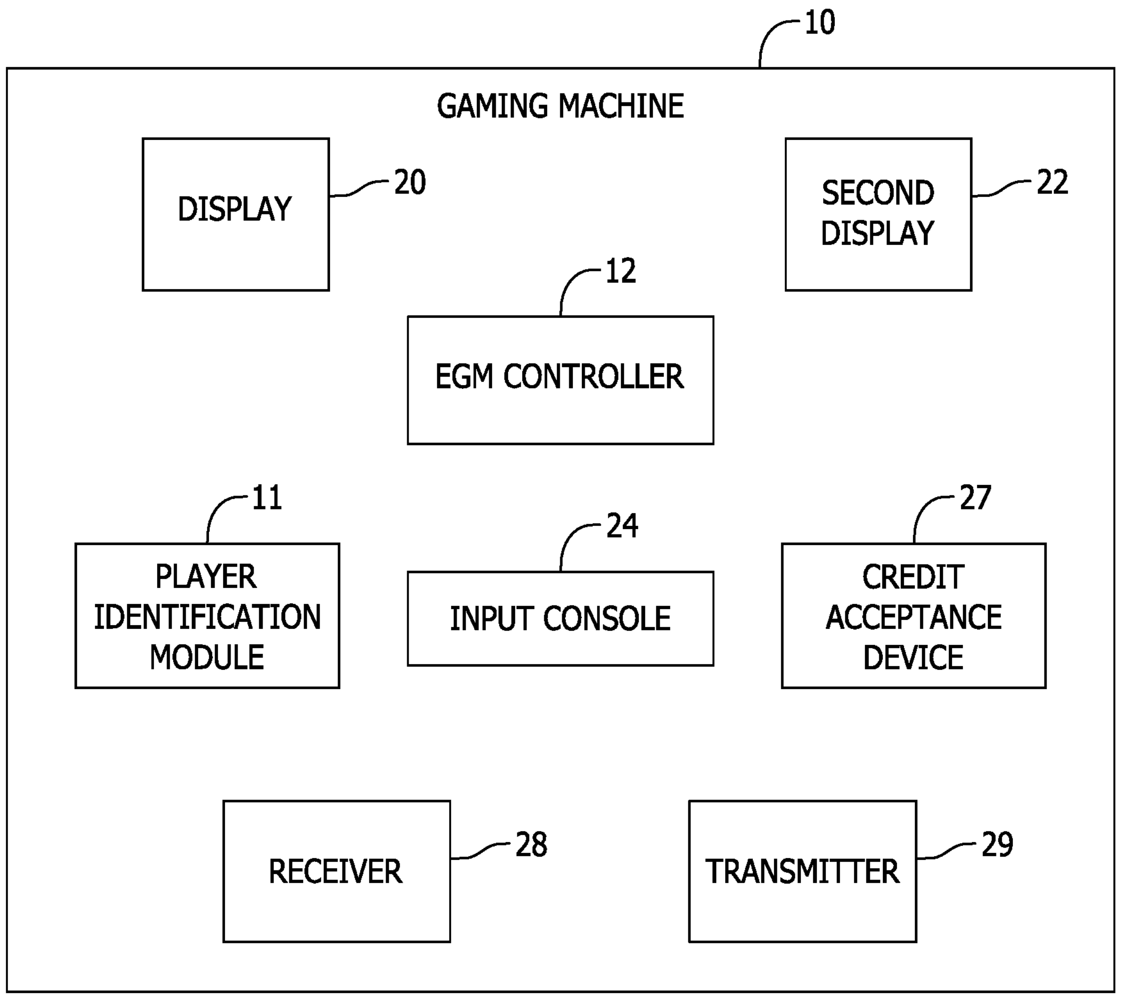
FIG. 2 is a diagram illustrating an exemplary gaming machine that may be included in the gaming system shown in FIG. 1.

FIG. 2 is a diagram illustrating an exemplary gaming machine 10 that may be included within gaming system 100 (shown in FIG. 1).

In the exemplary embodiment, an exemplary gaming machine 10 is included which may be located in a casino or other gaming environment. More specifically, in the exemplary embodiment, gaming machine 10 is an electronic gaming machine that includes various components such as a controller 12, a display 20, an input console 24, a credit accepting device 27, a receiver 28, and a transmitter 29. Controller 12 may also be referred to as a game controller 12, and may be used to control overall operation of gaming machine 10 and the games which run thereon. Display 20 may include one or more displays, such as plasma screen displays, LCDs, LEDs, OLEDs, and/or the like, for displaying game screens. In some embodiments, gaming machine 10 may also include a second patron access screen 22 that displays additional data, such as game data, to the player of gaming machine 10. Player input console 24 enables a user to interact with gaming machine 10 and may include, for example, a bank of buttons 26 positioned in a mid-trim of gaming machine 10. Buttons 26 may alternatively or additionally be provided as part of display 20, in a touch-screen type manner.

Credit accepting device 27 may include one or more mechanisms capable of receiving a monetary payment from a user. Accordingly, a user can establish an amount of credit with gaming machine 10 by adding money to the credit accepting device. For example, credit accepting device 27 may include a note acceptor (not shown) adapted to accept bank notes as well as cashless instruments, such as paper tickets or coupons, for inputting credits. The note acceptor may additionally be configured to dispense notes and tickets/coupons, for paying out winnings. Credit accepting device 27 may include a coin input and output tray that are provided as an alternative means for inputting credits and dispensing cash winnings, respectively. Device 27 may also include a card reader capable of reading a payment card, for example, a credit card, debit card, and the like. An in-machine meter (not shown) may also be provided to cooperate with a central control system (not shown) for providing information about an amount of game plays, amounts of wagers, payoffs, and the like.

According to various examples, a user may input a monetary form of credit through credit accepting device 27. Player input console 24 may include a button 24 or other means of input that is capable of receiving a wager from the user. For example, each time a button 24 corresponding to a wager is pressed, the amount of money wagered by the user may increase. Also, when a user determines to play a game offered by gaming machine 10, the amount of credit stored in gaming machine 10 and received by credit accepting device 27, may be reduced by the amount wagered by the user. Furthermore, when a user wins, the amount of credit stored in gaming machine 10 may increase based on the amount won.

Referring again to FIG. 2, gaming machine 10 also includes a player identification module 11 that may include a reading device for ascertaining a player's identification. The reading device may, for example, take the form of a card scanner (not shown) for reading a loyalty card or other form of portable storage medium capable of being read by the card scanner. By reading the loyalty card, and the like, gaming machine 10 may determine an identification of a registered user of the gaming system 100 (shown in FIG. 1). As another example, player input console 24 may include one or more input units (not shown) that enable a user to input security information to identify the user as a registered user. For example, the one or more input units may include a keypad, a mouse, a biometric sensor, an RFID reader, and the like. Accordingly, using an input unit, the user may enter a username, a password, biometric information, a loyalty card account number, and the like, which may be used by the host computer to identify the user as a registered user.

After receiving a user's identification, the user identification may be transmitted to host computer 70 (shown in FIG. 1) via transmitter 29. For example, transmitter 29 may transmit the user identification to host computer 70. In response, host computer 70 may determine the user is a registered user and transmit user media data corresponding to the registered user to receiver 28 of gaming machine 10. In response, controller 12 may modify (i.e. substitute for or replace) default game parameters of a wager game being wagered on by the user with personalized user media data of the corresponding user, and output the game via the main display 20 in which the user media data is displayed or output within or along with the game.

In another example, rather than receive user input regarding a user's identification information, gaming machine 10 may include a bar code, for example, a quick response (QR) code or other code located on an outer surface of gaming machine 10, displayed by a display of gaming machine 10, and/or the like. Accordingly, a user may scan the bar code using a mobile device, and in doing so may receive identification information of gaming machine 10 and an identification of wager games offered by the gaming machine that may be modified with user media data. In this example, a mobile application corresponding to host computer 70 may reside on the mobile device operated by the user. Accordingly, the mobile device may decrypt and forward the gaming machine identification information, together with the user's unique access code and password, to host computer 70. Host computer 70 may subsequently retrieve the digital media data electronically linked with the relevant player profile and automatically communicate the user media data to gaming machine 10. In this example, gaming machine 10 may automatically receive the user media data from host computer 70 without requesting or transmitting anything first to host computer 70.

Figure 3:
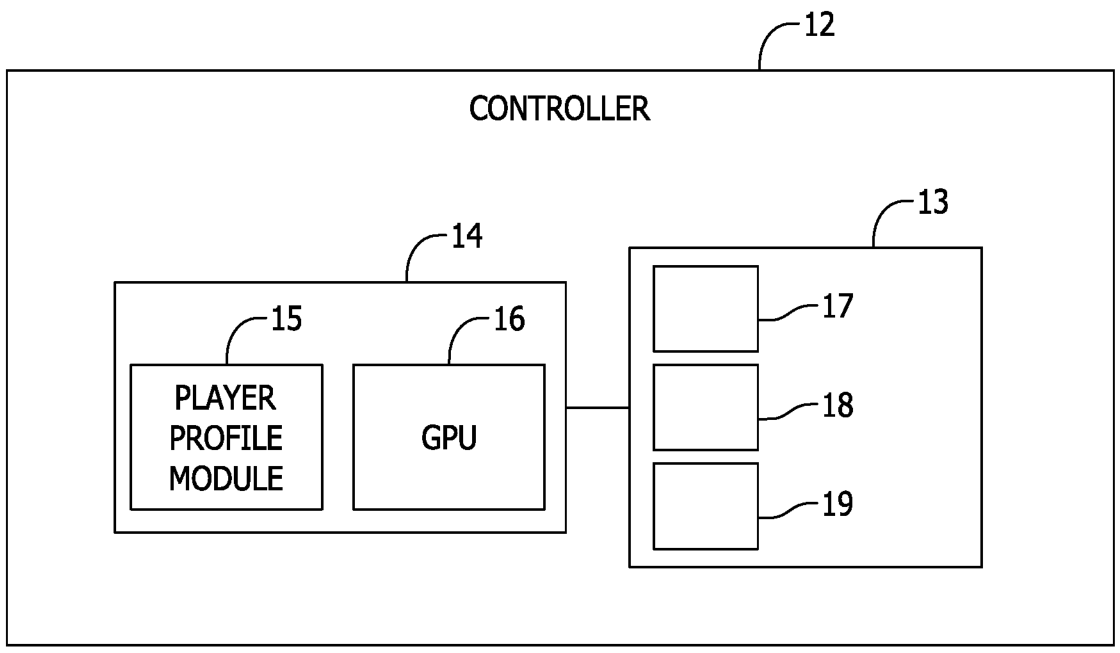
FIG. 3 is a diagram illustrating an exemplary controller that may be included in the gaming machine shown in FIG. 2.

FIG. 3 is a diagram illustrating an exemplary controller 12 that may be included in gaming machine 10 (shown in FIG. 2).

In the exemplary embodiment, controller 12 includes a central processing unit (CPU) 14 and a storage device 13. CPU 14 may control (e.g. based on program code stored in storage device 13) various software and hardware modules for personalizing wager games that are played on gaming machine 10 (shown in FIG. 2). In this exemplary embodiment, only those modules for carrying out wager game personalization are shown in FIG. 3, but it should be appreciated that controller 12 may include other components not illustrated. For example, controller 12 may be or may include one or more processing devices, for example, a multi-core processor, a reconfigurable processor, and the like.

In this example, CPU 14 includes a player profile module 15 that may communicate with a software application hosted by host computer 70 (shown in FIG. 1). Player profile module 15 may download, or otherwise receive, user media data that may be used for wager game personalization. In an example, controller 12 may control player profile module 15 to download media data for wager game personalization from host computer 70. In some examples, player profile module 15 may communicate with the reading device (not shown) included in the player identification module 11 (shown in FIG. 2) for retrieving player identification data, which may be utilized for accessing player profile data from host computer 70.

CPU 14 also includes a graphics processing unit (GPU) 16 that implements a graphics rendering engine. GPU 16 may retrieve data stored in storage device 13 and render an image, a video, and the like, on display 20 (shown in FIG. 2) of gaming machine 10. For example, GPU 16 may retrieve personalized user media data from storage device 13 and render an image based on the user media data. In some examples, the user media data may only account for some of the visual and/or audio parameters of a wager game. In this example, GPU 16 may also retrieve default data for the remaining parameters and combine the default data with the user media data to generate a complete image and audio data for the game, and may render the combined data to a screen of display 20.

In the exemplary embodiment, storage device 13 includes default storage 17, personalized profile storage 18, and game graphics storage 19. For example, each of default storage 17, personalized profile storage 18, and game graphics storage 19 may correspond to a library and may include configuration data, documentation, help data, message templates, pre-written code and subroutines, classes, values, type specifications, and/or the like, which may be used by GPU 16 to render the game on gaming machine 10. While separate storages are illustrated for convenience, it should be appreciated that one or more of the storage devices may be combined. Also, more storage devices than those shown in FIG. 3 may be included in storage device 13.

GPU 16 may communicate with both default profile storage 17, which stores default images, video, and/or audio of the parameters of the games played on gaming machine 10, and personalized profile storage 18 which stores user selected media data (e.g. images, video, and audio) that are received from host computer 70. For example, GPU 16 may communicate with default profile storage 17 and personalized profile storage 18, simultaneously. As another example, GPU 16 may communicate with default profile storage and personalized profile storage 18, sequentially. GPU 16 may generate a rendered image or video to be displayed on display 20 of gaming machine 10 based on user media data stored in personalized profile storage 18, and based on default profile data stored in default profile storage 17.

GPU 16 may also communicate with game graphics library 19 which is pre-stacked with images/video for rendering during the game (i.e. with the aid of the rendering engine) by gaming machine 10, with the exception of certain library elements that are missing which may relate to customizable visual game play parameters that are missing. Prior to initiating game play, GPU 16 may be programmed to load any missing library elements with images from either default profile storage 17 or personalized profile storage 18 to change the game environment.

Figure 4:
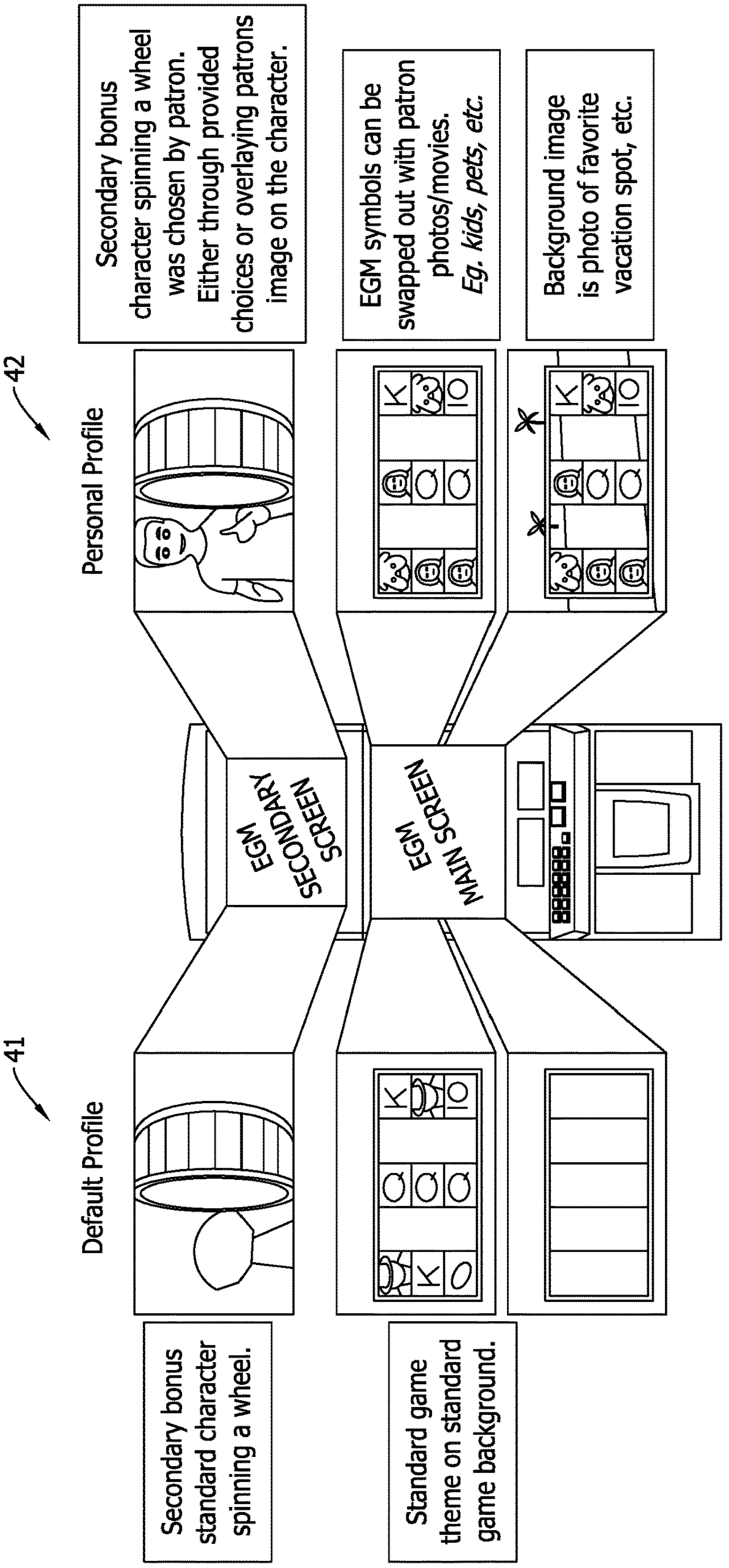
FIG. 4 is a diagram illustrating various exemplary wager game parameters of a game offered by a gaming machine that are capable of being personalized by a registered user and that may be displayed in the gaming system of FIG. 1.

FIG. 4 is a diagram illustrating various exemplary wager game parameters of a game offered by a gaming machine 10 that are capable of being personalized by a registered user and that may be displayed in gaming system 100 shown in FIG. 1.

In the exemplary embodiment, before a player is allowed to upload media data, or at the same time as uploading media data, a player may be asked to register with host computer 70. The user registration may be performed via the software application such as a website or mobile application provided by host computer 70 and may include generating a unique access code and password (which may be selected by the player). In response to a user being registered, the software application may create a player profile for the user and digital media uploaded by the user may be electronically linked to the created player profile and may be stored, for example, together with the player profile. According to various examples, the uploaded digital media may be assigned to parameters of a wager game for wager game personalization.

As a non-limiting example, host computer 70 may provide the user with a list of selectable parameters for customization. Accordingly, the user may select one of the parameters and choose one or more media files to apply thereto. For example, the user may select uploaded images, videos, and/or audio clips to be used to personalize (e.g. apply to) reel symbols, backgrounds, feature characters, and any other image, video, and audio clip related parameters of the game. Accordingly, when a wager game is played on gaming machine 10, parameters of a wager game being wagered on by the user at gaming machine 10 may be output having at least one parameter modified with user media data.

FIG. 4 illustrates an example of various default game parameters of a default profile 41 on the left and personalized game parameters of a personalized profile 42 on the right. In some examples, meta-data electronically linking the personalized gaming parameters with user media data may be stored by host computer 70 for use by GPU 16 of gaming machine 10. Accordingly, GPU 16 may use the meta-data to allocate the image, video, and/or audio data to an appropriate library element stored in a storage device of gaming machine 10 or controller 12. In various embodiments, the digital media of the user may be uploaded as any file type and/or any suitable compression scheme that is recognizable by the host computer, for example, GIF, JPG, MOV, MP4, etc.). In some examples, host computer 70, via a processor thereof, may perform subsequent image/video processing to convert the uploaded media into a suitable form for use by GPU 16.

In the exemplary embodiment, gaming machine 10 displays default game profile 41 on the left-hand side and includes default images, videos, and/or audio which are used to render or otherwise produce the characters, spinning wheel, game theme, background, and the like of the game. Default game profile 41 may be provided to any player that initiates game play on gaming machine 10. However, on the right-hand side, the display of gaming machine 10 includes various parameters of the game in which default parameters have been replaced by user media data to generate personalized profile 42, thus personalizing the game for the user. Personalized profile 42 may only be provided to a player who is determined to be the registered user who uploaded the user media data.

In this example, the character spinning the wheel in the upper display is a character chosen by the user. In addition, gaming symbols in the middle display include user photos and movies which correspond to kids and pets of the user. Also, the bottom picture includes a background image that is set by the user which includes a favorite vacation spot of the user. It should also be appreciated that FIG. 4 is merely an example and is not to be construed as limiting the features of the exemplary embodiments in any way.

In addition to enabling a user to register and upload personalized media data, host computer 70 may additionally provide registered players with a function for locating gaming machines which implement personalized wager games and instructions on how to access those gaming machines at a particular venue. For example, host computer 70 may provide players with the name of a gaming machine, a casino location of a gaming machine, an amount of gaming machines located at that casino which can implement personalized wager games, and the like.

Figure 5:
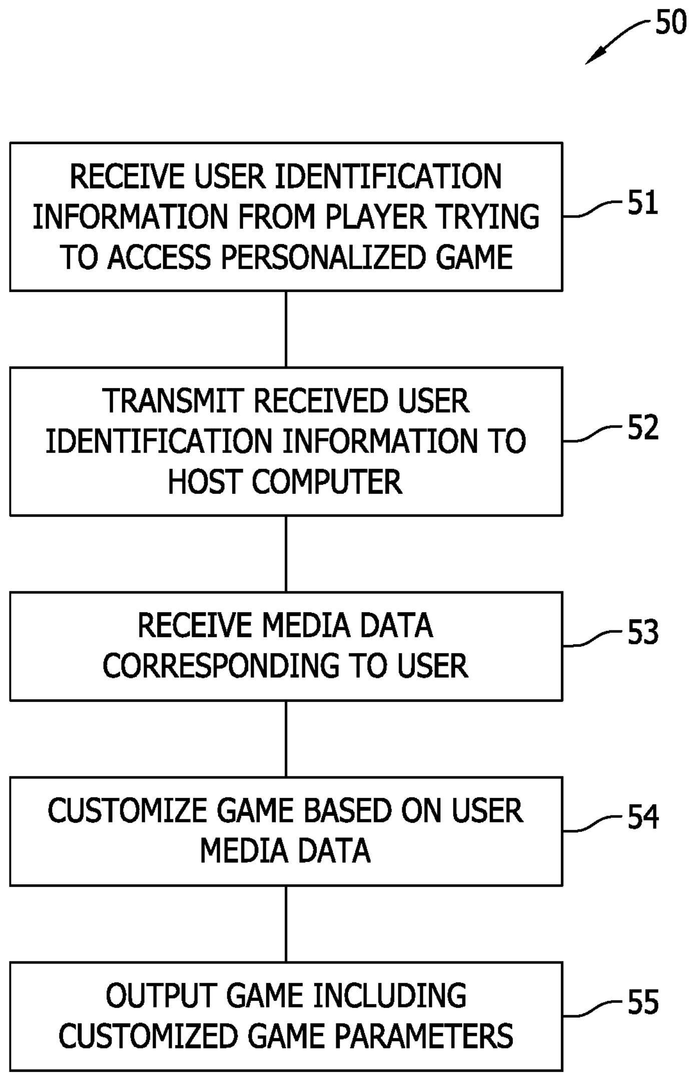
FIG. 5 is a diagram illustrating an exemplary method that may be implemented to configure a personalized wager game.

FIG. 5 is a diagram illustrating an exemplary method 50 that may be implemented to configure a personalized wager game. For example, method 50 may be performed by gaming machine 10.

In the exemplary embodiment, a user registered with the software application hosted by host computer 70 locates gaming machine 10 that provides a personalized wager game and that is connected to host computer 70. In 51, method 50 includes receiving user identification information that is entered by the user. For example, the user may enter a unique access code and password for accessing their player account/player profile. As another example, the user may insert a loyalty card into a card reader (not shown) of gaming machine 10 and card reader may read player information including security information which may be used to access the player account/player profile.

In 52, method 50 further includes transmitting the received user identification information to host computer 70 (shown in FIG. 1). Accordingly, host computer 70 may determine whether the user identification information matches previously stored registered user identification information.

In 53, method 50 includes receiving media data corresponding to the user and storing the user media data in a local storage of gaming machine 10. For example, in response to host computer 70 determining that the user identification information matches identification information of a player profile stored at host computer 70, host computer 70 may automatically transmit the user media data that is electronically linked to the player profile. Accordingly, gaming machine 10 may receive the user media data from host computer 70 based on the user identification information input by the user.

Next, a user may select a game to play that is offered by gaming machine 10 or gaming machine 10 may automatically initiate a game in response to receiving the user media data from host computer 70. In 54, method 50 includes customizing the selected game to include personalized media data of the user. For example, based on parameters that are electronically linked with user media data included in the media data received from host computer 70, gaming machine 10 may customize or otherwise modify a wager game to include parameters in which the personalized media data of the user is displayed or output when the wager game is being played and wagered on by a player. In addition, for those parameters of the game in which user media data has not been selected or otherwise established, gaming machine 10 may use the default game parameters and combine the default game parameters with the parameters of the game including customized personalized media data of the user.

Accordingly, in 55, controller 12 of gaming machine 10 is instructed to play a wager game including the customized gaming parameters. As a result, gaming machine 10 outputs the game on a display thereof in which personalized user media data is incorporated in place of default game parameters of the game.

It should also be appreciated that user identification does not need to be received at gaming machine 10. For example, gaming machine 10 may include a bar code disposed on an outer surface thereof, and the user may read the bar code, for example, a quick response (QR) code and the like. For example, the user may take a picture of the bar code using a camera thereof. After identifying themselves as a registered user with host computer 70, the user may upload the bar code to host computer 70, for example, through the website or mobile application provided by host computer 70. Accordingly, host computer 70 may recognize gaming machine 10 and provide user media data to gaming machine 10 based on the bar code uploaded by the user.

Figure 6:
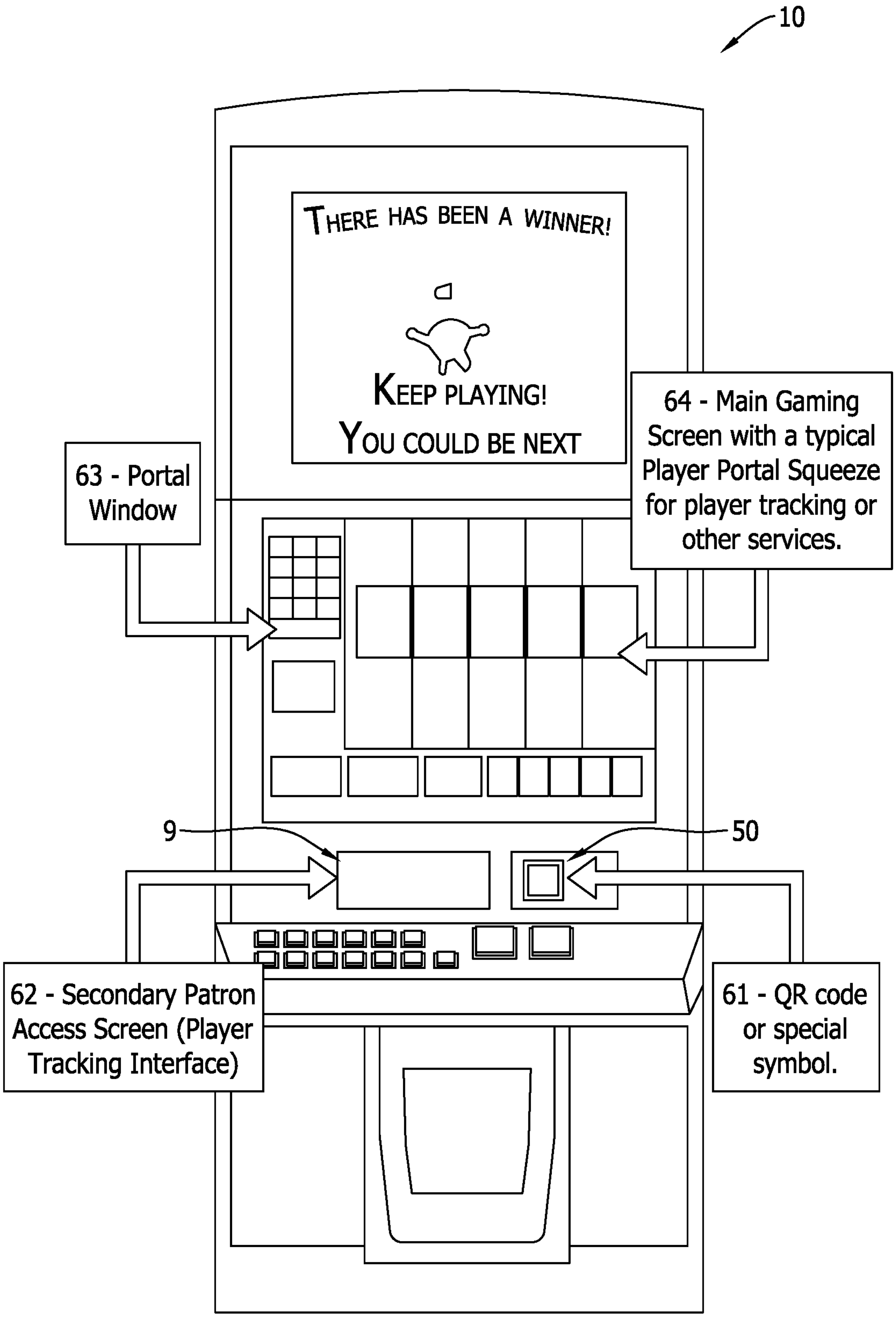
FIG. 6 is a diagram illustrating exemplary user identification examples that may be performed at a gaming machine for personalizing wager game parameters.

FIG. 6 is a diagram illustrating exemplary user identification examples that may be performed at a gaming machine for personalizing wager game parameters.

In the exemplary embodiment, player and gaming machine identification may be carried in a number of different ways. Referring to FIG. 6, at 61, a user may scan a QR code (or other suitable machine readable code) located on gaming machine 10 with the use of a camera of a mobile device. The QR code may encode relevant identification information for gaming machine 10. In this example, a mobile application corresponding to host computer 70 and residing on the user's mobile computing device may decrypt and forward the gaming machine identification information, together with the user's unique access code and password, to host computer 70. Host computer 70 may subsequently retrieve the digital media data electronically linked with the relevant player profile and communicate the user media data to gaming machine 10.

As another example, at 62, the user may enter their access code and password via a reading device or alternative input means (e.g. touch screen display) implemented by player identification module 11 of gaming machine 10. The access code and password may then be communicated to host computer 70 and, in response, host computer 70 may retrieve the digital media data electronically linked with the relevant player profile and communicate the user media data to gaming machine 10.

In a third example, at 63, player identification module 11 is operable to cause GPU 16 of controller 12 to display a variable portal window on the main game display of gaming machine 10 which causes gaming machine 10 to host a user access code/password prompt. Once the access code and password have been entered by the user, host computer 70 may retrieve the digital media data electronically linked with the relevant player profile and communicate the user media data to gaming machine 10.

In a fourth example, at 64, the user access code and the password prompt may be embedded within a base game environment and may be output on main game display 20 with a typical player portal squeeze for player tracking or other service.

Figure 7:
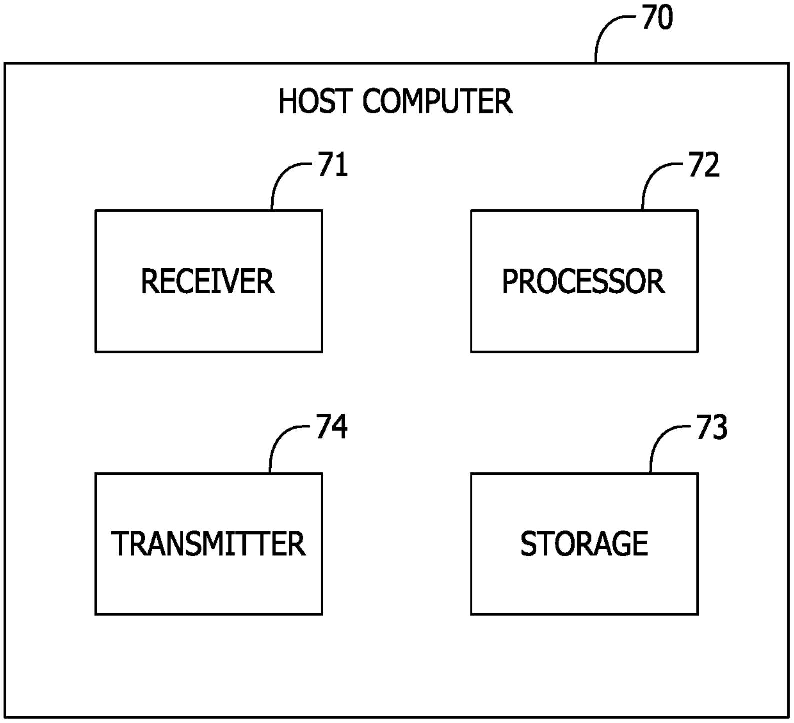
FIG. 7 is a diagram illustrating an exemplary host computer that may be included in the gaming system shown in FIG. 1.

FIG. 7 is a diagram illustrating an exemplary host computer 70 that may be included in gaming system 100 shown in FIG. 1.

In the exemplary embodiment, host computer 70 includes a receiver 71, a processor 72, a storage device 73, and a transmitter 74. As a non-limiting example, host computer 70 may be or may be included in a server, for example, a cloud-based server, and the like. Also, host computer 70 may correspond to the host computer 70 previously described herein.

Host computer 70 may provide (i.e. host) a software application such as a host website or mobile application which may be configured to register a user with host computer 70. For example, the software application may be processed and executed by processor 72. The user may communicate with host computer 70 through the software application hosted by host computer 70 via network 101 (shown in FIG. 1). In this example, the user may access host computer 70 using computing device 200 which is also connected to network 101. The user may register with host computer 70 by entering security information into the software application, for example, a username, password, biometrics, and the like. In response, processor 72 may create a player profile of the user including the security information, and store the player profile in storage device 73.

The registered user may upload personalized user media data to host computer 70. For example, processor 72 may control receiver 71 to receive the user media data, and may cause the user media data to be electronically linked to the player profile of the user and to be stored in storage device 73. In addition, the user may select user media data to be used to replace one or more parameters of a wager game provided by a gaming machine, for example, through the software application hosted by host computer 70. Accordingly, the user media data selected by the user to replace one or more parameters of the game may supersede any default parameters of the game which were previously set when the game is rendered to the display of the gaming machine.

Gaming machine 10 may also communicate with host computer 70. For example, a user may desire to play a game on gaming machine 10. The user may input the user's security information and/or swipe a user's loyalty card in a card reader of gaming machine 10. When the card is read, user information may be determined by gaming machine 10. Gaming machine 10 may transmit the security information and/or the loyalty card information to host computer 70. Accordingly, processor 72 may control receiver 71 to receive the security information and/or the loyalty account information of the user. Accordingly, processor 72 may determine whether the user information and/or loyalty account information corresponds to a user that is registered with host computer 70. In response to determining that the user is registered with host computer 70, processor 72 may cause transmitter 74 to transmit personalized user media data to gaming machine 10. Accordingly, gaming machine

10 may use the personalized user media data received from host computer 70 to modify a game being wagered on by the user by inserting user media data into parameters of the wager game.

Figure 8:
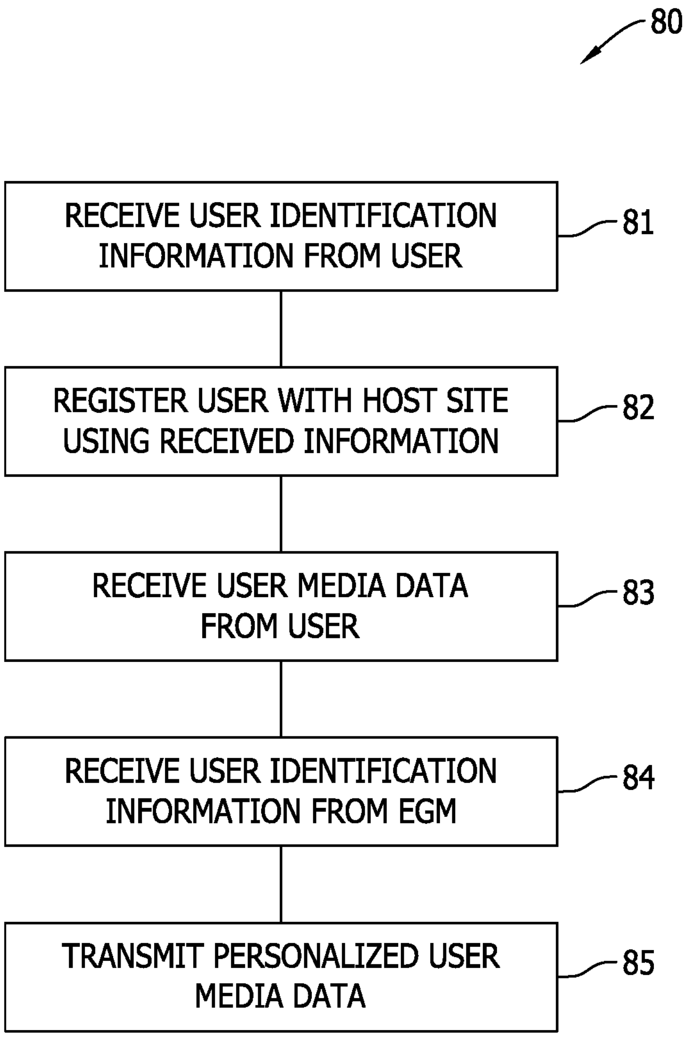
FIG. 8 is a diagram illustrating an exemplary method of a host computer providing user media data to a gaming machine.

FIG. 8 is a diagram illustrating an exemplary method 80 of host computer 70 providing user media data to gaming machine 10.

In the exemplary embodiment, in 81, the method 80 includes receiving user identification information from a user who desires to register with host computer 70. For example, the user identification information may be received via a website (i.e., a host site) or a mobile application that is hosted by host computer 70. In this example, the user may be using computing device 200 that is connected to host computer 70 via network 10 such as the Internet. The user may input the identification information through the host site and may include at least one of a username, a password, biometric information, and the like.

In 82, the method 80 includes registering the user with host computer 70. For example, host computer 70 may create a player profile corresponding to the user which includes the user identification information. Host computer 70 may electronically link the user identification information with the user player profile and store the user identification information in storage device 73.

In response to the user being registered with host computer 70, in 83 host computer 70 receives user media data that is uploaded by the user, for example, images, photos, videos, audios, and the like. In this example, the user media data may be data generated by a device of the user, or may be retrieved by the user from another source, such as a website, external storage, a camera, a computer-readable storage medium, an MP3 player, a computer, and the like. As another example, a previously registered user may logon to the hosted website or mobile application and enter user media data that may be electronically linked with the user's player profile.

In 84, the method 80 further includes receiving user identification information from gaming machine 10 that is connected to host computer 70 through network 101. For example, a registered user may input their respective user identification information to gaming machine 10, and gaming machine 10 may transmit the user identification information to host computer 70. The user identification information may be a username, password, biometric information, a bar code, and the like. In response to receiving the user identification information from gaming machine 10, host computer 70 may determine whether a user corresponding to the user identification information is registered with the host site of host computer 70.

Upon determining that the user corresponding to the user identification information received from gaming machine 10 is a registered user, in 85, host computer 70 transmits personalized user media data to gaming machine 10 for gaming machine 10 to use in place of default gaming parameters of a game provided by gaming machine 10.

According to various aspects herein, provided is a gaming system that may include a gaming machine, a host computer, and a computing device which may be connected to each other through a network. Using the computing device, such as a computer or a mobile device, a user may register with the host computer through a software application offered by the host computer. Also, the registered user may upload user media data, and select user media data to be displayed during game play at the gaming machine. Accordingly, when the user begins playing the game on the gaming machine, the gaming machine can render the game to include the personalized media data of the user.

In some examples, the gaming system may be implemented over a distributed architecture where some of the individual gaming machine modules are implemented remotely. For example, in one particular form, the gaming system may implement a video lottery terminal architecture whereby a central control server that is located remotely of the gaming machines, further includes a controller which controls some or all of the game play and personalization functionality (i.e. such that the gaming machines essentially operate as remote client terminals arranged to provide audible and/or visual gaming information to a player and allow player interaction with the central control computer). A plurality of client terminals may be in communication with the central control server over a communications network such as a local area network and/or a wide area network.

In some examples, the player may additionally or alternatively select stock images/videos/audio (i.e. pre-stored by the software application of the host computer) for storing with their player profile. In an alternative embodiment, the game play functionality may be implemented by both the gaming machine and the central control server such that they collectively provide a game controller.

It will be appreciated that in the example of the video lottery terminal architecture outlined above, the game controller may have access to associated memory and storage devices. The controller may also have access to computer executable code for running the gaming algorithm that performs embodiments of the present disclosure. In one embodiment the computer executable code is in the form of software and associated data, which are stored upon a computer-readable medium in the form of one or more compact disks. Alternative embodiments make use of other forms of digital storage media, such as Digital Versatile Discs (DVD's), hard drives, flash memory, Erasable Programmable Read-Only Memory EPROM, and the like. Alternatively, the software and its associated data may be stored as one or more downloadable or remotely executable files that are accessible via a computer communications network such as the Internet.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database," "memory," "storage," and the like may refer generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for modifying a wager game being played with personalized user media data. In this example, the computing device may include a memory device and a processor in communication with the memory device, and when executed by said processor the computer-executable instructions may cause the processor to perform a method such as the methods described and illustrated herein.

As used herein, a processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may include any programmable system including systems using micro-controllers, reduced instruction set circuits (RISC), application specific integrated circuits (ASICs), logic circuits, and any other circuit or processor capable of executing the functions described herein. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A host computer comprising:

a receiver configured to:

receive user identification information of a player;

receive user media data provided by the player, the user media data including at least one of an image, a video, and an audio file associated with the player, the user media data being in a first file type;

store the user media data as associated with the player;

receive security information associated with the player; and receive identification information associated with a gaming machine, wherein the identification information comprises information decrypted by a player computing device associated with the player in response to the player computing device receiving a machine readable gaming machine identifier associated with the gaming machine;

a processor configured to:

register the player with the host computer by generating a player profile for the player, the player profile being electronically linked with the user identification information and the user media data stored on the host computer;

convert the user media data from the first file type to a second file type usable at the gaming machine;

store meta-data associated with the converted user media data, the meta-data linking at least a portion of the converted user media data to a library element used by the gaming machine; and in response to receiving the security information and the identification information, identify the gaming machine and at least the portion of the converted user media data stored as being associated with the player for transmission from the host computer to the gaming machine; and a transmitter configured to transmit, to the gaming machine and in response to the processor identifying the gaming machine and at least the portion of the converted user media data, i) at least the portion of the converted user media data in the second file type and ii) the meta-data such that the gaming machine allocates at least the portion of the converted user media data to the library element at the gaming machine upon receipt of at least the portion of the converted user media data and the meta-data.

2. The host computer of claim 1, wherein the receiver is further configured to receive user selection of at least one parameter of a game played at the gaming machine.

3. The host computer of claim 2, wherein the receiver is further configured to receive user selection of at least one media file included in the converted user media data stored at the host computer, the at least one media file including at least one of the image, the video, and the audio file associated with the player.

4. The host computer of claim 3, wherein the at least one media file is configured to replace the at least one parameter of the game played at the gaming machine.

5. The host computer of claim 4, wherein the at least one parameter includes a plurality of reel symbols and the at least one media file includes a plurality of images, the plurality of images configured to replace at least a portion of the plurality of reel symbols.

6. The host computer of claim 1, wherein the receiver is further configured to receive, from the player computing device of the player, a player request for a location of at least one gaming machine configured to implement the converted user media data in to at least one game.

7. The host computer of claim 6, wherein the processor is configured to identify the location of at least one gaming machine configured to implement the converted user media data and generate a message including an identification of the location of the at least one gaming machine.

8. The host computer of claim 7, wherein the transmitter is configured to transmit the message to the player computing device of the player.

9. The host computer of claim 1, wherein the receiver receives the security information corresponding to the registered player from the gaming machine, and the transmitter transmits the at least the portion of the converted user media data stored on the host computer from the host computer to the gaming machine in response to verifying the received security information corresponds to the registered player.

10. The host computer of claim 1, wherein the transmitter is further configured to automatically transmit at least the portion of the converted user media data to the gaming machine in response to the processor receiving the security information and the identification information and without receiving a request for at least the portion of the converted user media data from the gaming machine.

11. An electronic gaming system including:

an electronic gaming machine (EGM) including a game controller; and a host computer in communication with the EGM, the host computer comprising:

a receiver configured to:

receive user identification information of a player;

receive user media data provided by the player, the user media data including at least one of an image, a video, and an audio file associated with the player, the user media data being in a first file type;

store the user media data as associated with the player;

receive security information associated with the player; and receive identification information associated with the EGM, wherein the identification information comprises information decrypted by a player computing device associated with the player in response to the player computing device receiving a machine readable EGM identifier associated with the EGM;

a processor configured to:

register the player with the host computer by generating a player profile for the player, the player profile being electronically linked with the user identification information and the user media data stored on the host computer;

convert the user media data from the first file type to a second file type usable at the EGM;

store meta-data associated with the converted user media data, the meta-data linking at least a portion of the converted user media data to a library element used by the EGM; and in response to receiving the security information and the identification information, identify the EGM and at least the portion of the converted user media data stored as being associated with the player for transmission from the host computer to the EGM; and a transmitter configured to transmit, to the EGM and in response to the processor identifying the EGM and at least the portion of the converted user media data, i) at least the portion of the converted user media data in the second file type and ii) the meta-data such that the EGM allocates at least the portion of the converted user media data to the library element at the EGM upon receipt of at least the portion of the converted user media data and the meta-data.

12. The electronic gaming system of claim 11, wherein the receiver is further configured to receive user selection of at least one parameter of a game played at the EGM.

13. The electronic gaming system of claim 12, wherein the receiver is further configured to receive user selection of at least one media file included in the converted user media data stored at the host computer, the at least one media file including at least one of the image, the video, and the audio file associated with the player.

14. The electronic gaming system of claim 13, wherein the game controller is configured to replace the at least one parameter of the game played at the EGM with the at least one media file.

15. The electronic gaming system of claim 14, wherein the at least one parameter includes a plurality of reel symbols and the at least one media file includes a plurality of images, and wherein the game controller is configured to replace at least a portion of the plurality of reel symbols with the plurality of images.

16. The electronic gaming system of claim 11, wherein the receiver is further configured to receive, from the player computing device of the player, a player request for a location of at least one EGM configured to implement the converted user media data in to at least one game.

17. The electronic gaming system of claim 16, wherein the processor is configured to identify the location of at least one EGM configured to implement the converted user media data and generate a message including an identification of the location of the at least one EGM.

18. The electronic gaming system of claim 17, wherein the transmitter is configured to transmit the message to the player computing device of the player.

19. The electronic gaming system of claim 11, wherein the receiver receives the security information corresponding to the registered player from the EGM, and the transmitter transmits the at least a portion of the converted user media data stored on the host computer from the host computer to the EGM in response to verifying the received security information corresponds to the registered player.

20. A method for modifying an electronic game implemented by a computing system comprising at least one receiver, at least one processor, and at least one transmitter, the method comprising:

receiving user identification information of a player;

receiving user media data provided by the player, the user media data including at least one of an image, a video, and an audio file associated with the player, the user media data being in a first file type;

storing the user media data as associated with the player;

receiving security information associated with the player;

receiving identification information associated with a gaming device, wherein the identification information comprises information decrypted by a player computing device associated with the player in response to the player computing device receiving a machine readable gaming machine identifier associated with the gaming device;

registering the player with the computing system by generating a player profile for the player, the player profile being electronically linked with the user identification information and the user media data stored in the computing system;

converting the user media data from the first file type to a second file type usable at the gaming device;

storing meta-data associated with the converted user media data, the meta-data linking at least a portion of the converted user media data to a library element used by the gaming device;

in response to receiving the security information and the identification information, identifying the gaming device and at least the portion of the converted user media data stored as being associated with the player for transmission from the computing system to the gaming device; and transmitting to the gaming device and in response to identifying the gaming device and at least the portion of the converted user media data, i) at least the portion of the converted user media data in the second file type and ii) the meta-data such that the gaming device allocates at least the portion of the converted user media data to the library element at the gaming device upon receipt of at least the portion of the converted user media data and the meta-data.

* * * * *